United States Patent
Uchida

(10) Patent No.: US 10,717,437 B2
(45) Date of Patent: Jul. 21, 2020

(54) AUTOMATIC DRIVE CONTROL DEVICE AND AUTOMATIC DRIVE CONTROL METHOD

(71) Applicant: HITACHI, LTD., Tokyo (JP)

(72) Inventor: Naokazu Uchida, Tokyo (JP)

(73) Assignee: HITACHI, LTD., Tokyo (JP)

( * ) Notice: Subject to any disclaimer, the term of this patent is extended or adjusted under 35 U.S.C. 154(b) by 195 days.

(21) Appl. No.: 15/764,895

(22) PCT Filed: Oct. 6, 2015

(86) PCT No.: PCT/JP2015/078366
§ 371 (c)(1),
(2) Date: Mar. 30, 2018

(87) PCT Pub. No.: WO2017/060978
PCT Pub. Date: Apr. 13, 2017

(65) Prior Publication Data
US 2018/0281788 A1 Oct. 4, 2018

(51) Int. Cl.
*G01C 22/00* (2006.01)
*G05D 1/00* (2006.01)
(Continued)

(52) U.S. Cl.
CPC ......... *B60W 30/0956* (2013.01); *B60K 35/00* (2013.01); *B60W 30/08* (2013.01);
(Continued)

(58) Field of Classification Search
CPC .. B60W 30/0956; B60W 30/08; B60W 40/09; B60W 50/00; B60W 50/082;
(Continued)

(56) References Cited

U.S. PATENT DOCUMENTS

| 8,352,110 B1 | 1/2013 | Szybalski et al. |
| 2015/0274158 A1 | 10/2015 | Fujita |

(Continued)

FOREIGN PATENT DOCUMENTS

| JP | 2015-153048 A | 8/2015 |
| WO | 2014/073079 A1 | 5/2014 |

OTHER PUBLICATIONS

International Search Report of PCT/JP2015/078366 dated Dec. 22, 2015.

*Primary Examiner* — Mahmoud S Ismail
(74) *Attorney, Agent, or Firm* — Mattingly & Malur, PC

(57) ABSTRACT

With conventional automatic drive control, no consideration is given to whether the driver is in a condition to be able to drive the vehicle properly when automatic driving is cancelled. Accordingly, an automatic drive control device is switchable between a manual driving mode in which driving operation by the driver of the vehicle is required, and an automatic driving mode in which driving operation by the driver of the vehicle is not required. The device is equipped with: a surrounding conditions recognition unit for recognizing surrounding conditions of the vehicle; an information notification unit for notifying the driver of the vehicle; and an automatic drive control unit for carrying out control of the vehicle in automatic driving mode, and controlling the information notification unit in such a way as to alert the driver of the vehicle on the basis of the surrounding conditions recognized by the surrounding conditions recognition unit.

8 Claims, 16 Drawing Sheets

(51) Int. Cl.
| | |
|---|---|
| *B60W 30/095* | (2012.01) |
| *B60K 35/00* | (2006.01) |
| *B60W 30/08* | (2012.01) |
| *B60W 50/00* | (2006.01) |
| *G08G 1/16* | (2006.01) |
| *B60W 40/09* | (2012.01) |
| *B60W 50/14* | (2020.01) |
| *B60K 28/06* | (2006.01) |

(52) U.S. Cl.
CPC ............ *B60W 40/09* (2013.01); *B60W 50/00* (2013.01); *B60W 50/14* (2013.01); *G08G 1/16* (2013.01); *G08G 1/166* (2013.01); *B60K 28/06* (2013.01); *B60K 2370/175* (2019.05); *B60K 2370/1868* (2019.05); *B60K 2370/193* (2019.05); *B60K 2370/21* (2019.05); *B60W 2050/0095* (2013.01); *B60W 2554/00* (2020.02); *B60W 2554/801* (2020.02); *B60W 2556/50* (2020.02)

(58) Field of Classification Search
CPC ......... B60W 50/14; B60K 35/00; G08G 1/16; G08G 1/166; G05D 1/0061
USPC ............................................................ 701/23
See application file for complete search history.

(56) References Cited

U.S. PATENT DOCUMENTS

| | | | |
|---|---|---|---|
| 2016/0280236 A1* | 9/2016 | Otsuka | .................. B60W 10/20 |
| 2016/0355190 A1 | 12/2016 | Omi | |
| 2017/0010612 A1* | 1/2017 | Asakura | ............. G01C 21/3461 |
| 2017/0341646 A1* | 11/2017 | Terashima | .......... B60W 30/182 |
| 2018/0208211 A1* | 7/2018 | Chiba | .................. G05D 1/0088 |
| 2019/0004513 A1* | 1/2019 | Chiba | ...................... B60T 7/22 |

* cited by examiner

FIG. 9

| 901 | 902 | 903 | 904 | 905 | 906 |
|---|---|---|---|---|---|
| ID | KIND | SIZE H W D (m) | RELATIVE COORDINATE (x, y) (m) | MOVING DIRECTION | MOVING SPEED (km/h) |
| 1 | VEHICLE | 1.0 × 2.0 × 3.5 | (-2.1, 8.2) | - | 0 |
| 2 | PEDESTRIAN | 1.7 × 0.5 × 0.2 | (-3.5, 6.2) | 6 | 4.0 |
| 3 | PEDESTRIAN | 1.6 × 0.5 × 0.2 | (3.6, 6.5) | 6 | 4.1 |
| 4 | VEHICLE | 1.0 × 2.0 × 3.0 | (0.5, -10.1) | 12 | 15.1 |
| 5 | PEDESTRIAN | 1.8 × 0.5 × 0.2 | (3.1, 14.3) | 10 | 0 |
| 6 | MOTORBIKE | 1.5 × 0.5 × 1.5 | (-3.0, -21.2) | 12 | 12.0 |
| 7 | PEDESTRIAN | 1.8 × 0.5 × 0.2 | (-4.0, -14.5) | 12 | 4.0 |

FIG. 10

| 1001 | 1002 | 1003 | 1004 | 1005 |
|---|---|---|---|---|
| ID | TTC1 | TTC2 | RISK LEVEL | NOTICE PRIORITY |
| 1 | 2.0 | - | A | 1 |
| 2 | - | - | C | 3 |
| 3 | - | - | C | 3 |
| 4 | - | - | D | - |
| 5 | - | 5.0 | B | 2 |
| 6 | - | - | D | - |
| 7 | - | - | D | - |

AUTOMATIC DRIVE CONTROL DEVICE AND AUTOMATIC DRIVE CONTROL METHOD

TECHNICAL FIELD

The present invention concerns an automatic drive control device and an automatic drive control method and, in particular, it relates to driving support control.

BACKGROUND ART

The background art of this technical field includes a patent publication of U.S. Pat. No. 8,352,110 patent publication (Patent literature 1). Patent literature 1 has a subject of performing smooth switching between automatic driving and manual driving and describes an automatic drive control device in which a system judges adequacy of starting automatic driving and responds to a driver upon the driver's automatic driving start operation, starts automatic operation when the driver accepts the response, and allows a light emitting device to emit light on a steering wheel, thereby showing that the automatic driving is being conducted.

CITATION LIST

Patent Literature

PTL 1: U.S. Pat. No. 8,352,110 Patent Publication

SUMMARY OF INVENTION

Technical Problem

The automatic drive control device described in Patent literature 1 is adapted to be switched to a manual driving upon releasing an automatic operation by judging the driver's touch to a steering wheel, but it is not taken into consideration whether the driver is in a state capable of normal driving or not. Even when the driver has touched the steering wheel, this does not always means that the driver is already in order for the driving operation. Since the driver may possibly be in an inattentive state during automatic driving and there is a risk that the driver's attentiveness may decline just after switching to the manual driving, it is necessary to guide the driver safely.

Solution to Problem

For solving the problem describes above, the present invention provides, as an example, an automatic drive control device capable of switching between a manual driving mode requiring a driving operation by a driver of a vehicle and an automatic driving mode not requiring driving operation by the driver of a vehicle, and includes a peripheral situation recognition section for recognizing peripheral situations of the vehicle, an information notification section for notifying the driver of the vehicle, and an automatic drive control section for controlling the information notification section so as to call attention to the driver of the vehicle based on peripheral situations recognized by the peripheral situation recognition section. The control of the information notification section by the automatic drive control section is adapted to include first driving support control performed during the manual driving mode and second driving support control performed after switching from the automatic driving mode to the manual driving mode until predetermined conditions are satisfied.

Advantageous Effects of Invention

According to the present invention, it is possible for safety switching from the automatic driving mode to the manual driving mode by supporting the recognition, judgement, and operation of the driver upon switching from the automatic driving to the manual driving.

BRIEF DESCRIPTION OF DRAWINGS

FIG. 9 is a table showing a result of recognizing an obstacle in an embodiment.

FIG. 10 is a table showing a result of evaluating a risk in an embodiment.

DESCRIPTION OF EMBODIMENTS

Preferred embodiments of the present invention are to be explained with reference to the drawings.

Preferred Embodiment

Figure 1:
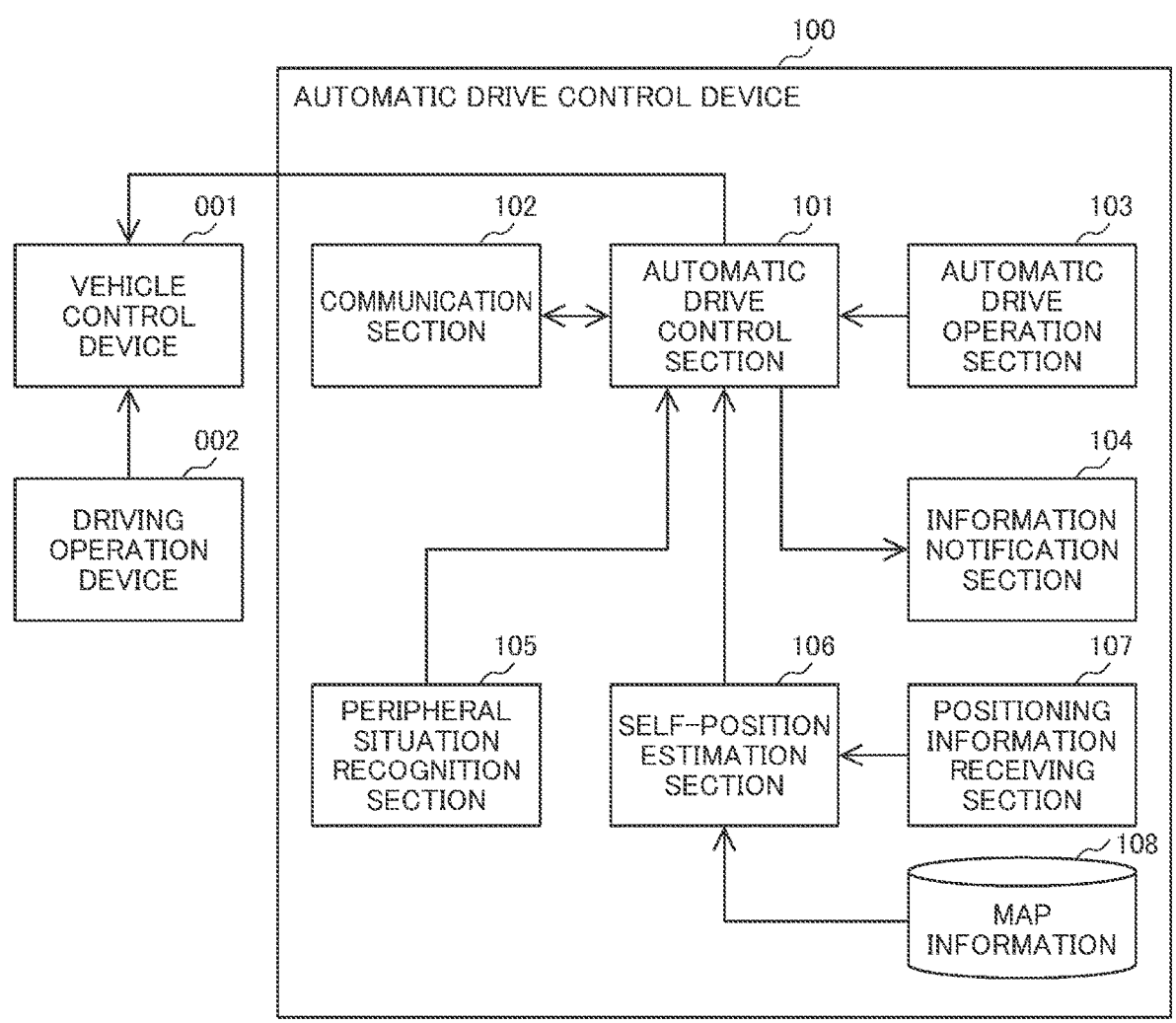
FIG. 1 is an example of a configuration of an automatic drive control device in an embodiment.

FIG. 1 illustrates a configurational example of an automatic drive control device in this embodiment. In FIG. 1, an automatic drive control device 100 is a device having a processor and a memory necessary for performing automatic drive control. A vehicle control device 001 is connected to driving devices such as an engine and a motor, a braking device, a steering device and an actuator for actuating them, and a steering motor of an unillustrated vehicle and has a function of controlling them by receiving instructions from the automatic drive control device 100. The automatic drive control device 100 can perform driving control of the vehicle whether driver's driving operation of the driver. In a case where the vehicle runs by the driving operation of the driver, the vehicle control device 001 controls the vehicle in accordance with signals from the driving operation device 002. In a case where the vehicle runs by automatic driving, the vehicle control device 001 controls the vehicle in accordance with control instruction signals from the automatic drive control device 100.

The driving operation device 002 is a device for operating the vehicle control device 001, which is a device having a function of transmitting driving operations of the driver to a steering wheel, an acceleration pedal, a brake pedal, a shift lever, etc. to the vehicle control device 001. In the manual operation mode, the driver conducts driving operation of the vehicle by using the driving operation device 002.

Further, when the driver operates the driving operation device 002 in the automatic driving mode, override with a priority to the operation conducted by the driving operation device 002 is performed and the automatic driving is temporarily released to enter the manual driving mode. In this case, the process returns to the automatic driving mode at the instance when the driver discontinues the driving operation.

The automatic drive control device 100 has an automatic drive control section 101, a communication section 102, an automatic driving operation section 103, an information communication section 104, a peripheral situation recognition section 105, a self-location estimation section 106, a positioning information receiving section 107, and a map information 108, which are connected to the vehicle control device 001 and the driving operation device 002. The automatic drive control device 100 has a function of sending an instruction to the vehicle control device 001 and controlling the operation of the vehicle without the driver's operation.

The automatic drive control section 101 calculates a running orbit based on the information obtained from the peripheral situation recognition section 105 and a self-location estimation section 106, and sends an instruction to the vehicle control device 001 to control the vehicle running. Further, in the manual driving mode, it judges a risk, for example, collision with a peripheral obstacle based on the information obtained by the peripheral situation recognition section 105 and calls attention by way of the information communication section 104 in accordance with the judged risk. Further, in a case where the collision risk is judged to be extremely high, it conducts automatic collision avoiding operation, for example, by applying emergency braking by controlling the vehicle control device 001 even in the manual driving mode.

The communication section 102 has a function of communicating with roadside units or other vehicles to acquire traffic information at the periphery of the vehicle. In the inter-vehicle communication, it acquires information for peripheral vehicles or pedestrians by way of roadside units, and acquires information of an obstacles that cannot be received sensor of the peripheral situation recognition section 105 because they enter the blind spot, for example, as in crossing points of poor visibility. According to the inter-vehicle communication, similar information is acquired from peripheral vehicles having a similar communication device. Further, it can acquire also traffic information such as conjunction or accident.

The automatic driving operation section 103 is a section of setting automatic control, for example, a distinction or route, a running speed, etc., includes a steering switch, a touch panel, etc. and has a function of transmitting driver's operation to the automatic drive control section 101.

The information notification section 104 is a device for transmitting various driving support functions and the state of the automatic driving functions notified from the automatic drive control section 101 to the driver. The section interprets the notification from the automatic drive control section 101, and performs various notification or guides to the driver by using previously stored message data, image data, voice data, sound effects, or light emission pattern data in accordance with the notification. The device for actual notification includes displays such as LED (liquid crystal display), organic EL (electroluminescence), a light emission device, for example LED (light emitting diode), a device for outputting voices such as a loudspeaker, vibration motor, etc.

A peripheral situation recognition section 105 is a device having a function of recognizing road configuration due to the detection of white lines and road end ahead of the vehicle, and recognizing vehicles, pedestrians, and obstacles at the periphery of the own vehicle, and includes a camera, a laser radar, milliwave radar, a supersonic sensor, etc. The peripheral situation recognition section 105 has a function of analyzing images at the periphery of a vehicle photographed by a camera, and the distance information to an obstacle at the periphery of the vehicle measured by a radar, and estimating locations, direction, kind, moving speed, and moving trace of each of the obstacles. The kind is, for example, a pedestrian, a bicycle, a motor bike, an automobile, etc. which can be estimated based on the size and the shape, the moving speed, etc. by using known techniques.

A positioning information receiving section 107 has a function of defining a location by receiving electric waves from a positioning satellite such as GPS (Global Positioning System). The positioning system to be utilized is not restricted only to the GPS and may be configured as other positioning system, so that electric waves for amendment can be received. If electric waves for amendment can be received, a location can be estimated at higher accuracy.

Map information 108 is detailed map information including road information used in the automatic drive control. It includes information of road configuration such as curvature of a curve, gradient, intersection, configuration of junction, number of lanes, and road width, limiting speed information, road kind information, for example, whether a road is an ordinary road or an expressway road, etc.

A self-location estimating section 106 has a function of amending the positioning result of the positioning information receiving section 107 based on the information of a gyro sensor or a direction sensor, and a vehicle speed, while referring to the map information 108 and estimating the running location of the vehicle.

Figure 2:
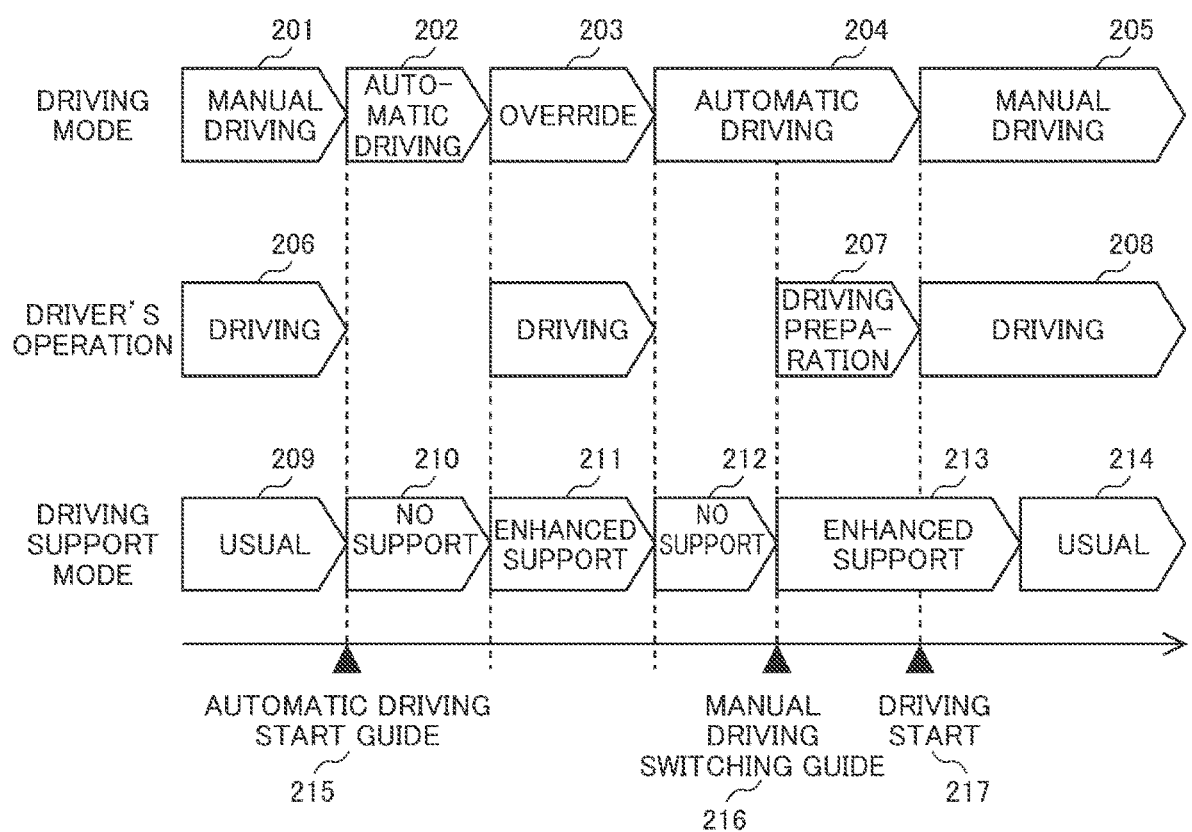
FIG. 2 is a view for explaining a relation between a driving mode and a driving support mode of the automatic drive control device in an embodiment.

FIG. 2 illustrates a drawing for explaining a driving mode and a driving support mode provided in the automatic drive control device 100 in this embodiment. In FIG. 2, the driving mode includes three modes of a manual driving mode in which a driver performs driving operation of the vehicle (201, 205), an automatic driving mode in which the automatic drive control device 100 controls the vehicle (202, 204), and override (203) in which the mode is temporarily enters manual driving during automatic driving mode (203).

201 to 205 show a state of starting driving by the manual driving mode, after which the automatic drive control device 100 switches to the automatic driving mode by receiving an automatic driving start guide 215 performed by way of the information communication section 104 during running, interposes override in the midway and then returns again to the manual driving upon receiving a manual driving switching guide (216).

FIG. 2 assumes a situation in which an automatic driving possible area is limited in view of the performance of the automatic drive control device 100. In the switching under such situation, the self-location estimation section 106 detects arrival at the automatic driving possible area, the information communication section 104 guides switching to the automatic driving mode, and the manual operation mode is switched to the automatic driving mode when the driver discontinues the driving operation. Switching from the manual driving mode to the automatic driving mode is triggered exactly when the driver releases a hand from a pedal or a steering wheel after automatic driving start guide 215 and this is detected by the automatic drive control device 100 by way of the driving operation device 002 and the vehicle control device 001.

Further, switching from the automatic driving mode to the manual driving mode is also triggered in the same manner the automatic drive control device 100 detects that the driver has operated the pedal or the steering wheel after the manual driving switching guide 216. Switching may also be performed by a predetermined operation such as depression of a button for releasing the automatic driving mode so that the driver can clearly notice of switching to the manual driving mode.

A term (207) that the driver prepares for driving is provided from notification of the manual driving switching guide 216 until the switching to the manual driving mode. Meanwhile, the driver makes preparation capable of driving, for example, adjusting posture, turning the eyes ahead again, holding steering wheel, etc.

Then, three driving support modes (enhanced support, usual support, no support) in each of the driving modes are to be explained. During the manual driving mode, the automatic drive control device 100 calls attention in a case, for example, where the inter-vehicle distance to a preceding car is shorter, where a pedestrian approaches, etc. The attention calling urges the driver to take avoiding action to attain safe running. On the other hand, in the automatic driving mode, since the avoiding action is taken automatically by the automatic drive control device 100, attention calling is not necessary. Accordingly, driving support such as attention calling is not taken during the automatic driving mode (210).

Then, upon switching from the automatic driving mode to the manual driving mode, the driving support is started again. Upon switching to the manual driving, since the driver does not perform driving operation including safety confirmation during the automatic driving mode, it takes time for recognizing the surrounding traffic situations. Further, by the same reason, the driver may be in an inattentive state where the driver's attention declines. Accordingly, upon switching from the automatic driving mode to the manual driving mode, the driving support is enhanced more than in a usual state. The driving support in such a case is referred to as an enhanced support mode (211, 213) and the driving support in usual manual driving is referred to as a usual support mode (209, 214). The enhanced support mode is a mode that calls attention also to an obstacle at such a low risk that attention is not called usually.

The enhanced support mode starts simultaneously with the manual driving switching guide (216), and continues for a while (213) also after the driver starts driving (217). After establishing predetermined conditions, the mode is switched to the usual support mode (214). Further, also during override in the automatic driving mode, the driving support by the enhanced support mode is performed in the same manner (211).

Figure 3:
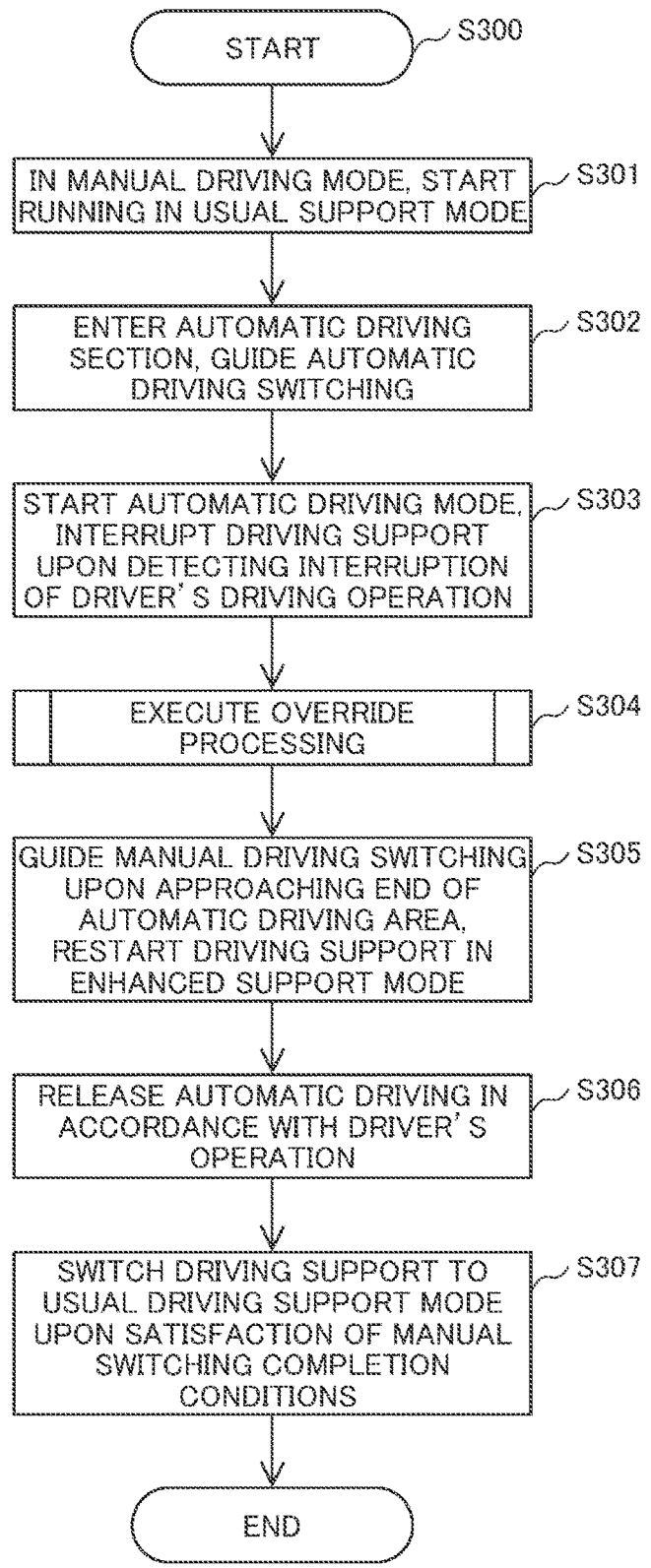
FIG. 3 is a flow chart for explaining automatic manual starting switching processing and driving support mode switching processing in an embodiment.

FIG. 3 shows a flow chart for the switching processing between the automatic driving mode and the manual driving mode as well as switching processing of the enhanced support mode in this embodiment. In FIG. 3, when running is started first, in the manual driving mode, the automatic drive control device 100 starts driving support in the usual support mode simultaneously with starting of running (S301). Then, when the vehicle enters the automatic driving area, the automatic drive control device 100 guides switching to the automatic driving mode by way of the information communication section 104 (S302).

Upon receiving the guide, the driver detaches a hand off the steering wheel and releases a foot from the pedal. Then, the automatic drive control device 100, detecting this, starts the automatic driving mode and, at the same time, discontinues driving support (S303). In the flow chart shown in FIG. 3, it is assumed that running is started in the manual driving mode, but when running is started in the automatic driving mode, the driving support is not applied from the start of running.

During the automatic driving mode, the override is monitored and, if there is the override, the mode is temporarily switched to the manual driving mode and the driving support is started by the enhanced support mode (S304).

Figure 4:
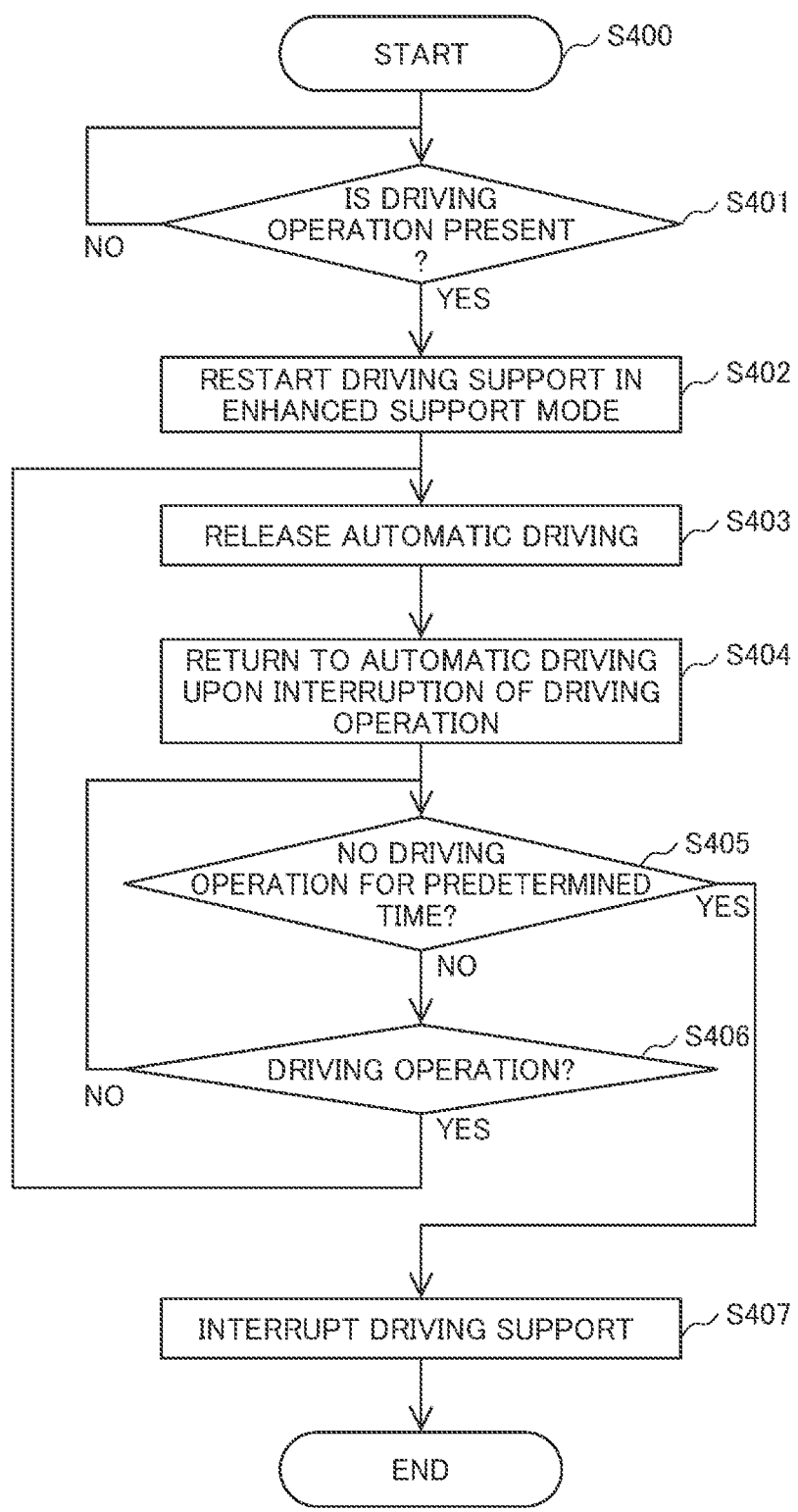
FIG. 4 is a flow chart for explaining override processing in an embodiment.

FIG. 4 illustrates a flow chart for explaining override processing in this embodiment. In FIG. 4, the automatic drive control section 101 monitors the driving operation device 002 by way of the vehicle control device 001 thereby monitoring whether the driving operation has been performed or not (S401).

When the driving operation has been detected (S401: YES), the driving support is restarted by the enhanced support mode (S402) and the automatic driving is cancelled (S403). In this case, the process is not returned to the automatic driving during detection of the driving operation. Meanwhile, the support driving is also continued and, for example, when the vehicle approaches to a preceding vehicle, attention is called. Then, the mode is returned to the automatic driving mode being triggered by that the driving operation is no more detected (S404).

In this process, while the driving mode is switched instantly, the driving support mode is not switched simultaneously but driving support by the enhanced support mode is continued for a while also after returning to the automatic driving mode. Such processing prevents intermittent attention calling when the driving operation is performed sporadically.

For example, in a case where corresponding attention is called upon erroneous approaching to a peripheral vehicle or a pedestrian in an override state, if the attention calling is terminated at the same time with the termination of the override, the attention calling may possibly disappear while the driver cannot yet confirm the content of the attention calling. Then, the driving support is adapted to continue for a predetermined time even for a momentary override. The operation support is discontinued and transferred to the usual automatic driving mode being triggered by that the driving operation is not detected for a predetermined time, for example, about 30 sec (S405: YES).

Referring again to the flow chart shown in FIG. 3, when the end of the automatic driving area approaches, the automatic drive control section 101 guides switching of manual driving by way of the information notification section 104 and starts the driving support in the enhanced support mode (S305). At the time when the manual driving switching is guided, the driving mode is in the automatic driving, it is intended to eliminate the inattentive state of the driver by such driving support as described above, thereby letting the driver understand the peripheral traffic situations as soon as possible. Further, if there is an obstacle at a high risk, an effect that the driver can correspond to the risk rapidly can be expected by transmitting such information before starting the manual driving.

Then, when the automatic drive control section 101 detects that the driver has performed driving operation, the automatic drive control section 101 terminates the automatic driving mode and restarts the manual driving mode (S306). Since the inattentive state of the driver is not always improved instantly also after starting the manual driving mode, the driving support by the enhanced support mode is continued for a while. Then, after predetermined conditions have been satisfied, the process is switched to the usual support mode (S307).

The conditions of switching to the usual support mode include that the driving operation is performed for a predetermined time, for example, running for one minute or running for 1 km or more in the manual driving mode. However, in a case of a straight road with no obstacles, improvement for the inattentive state may not possibly be made even after running for a predetermined time. Then, a condition of performing steering for more than a predetermined amount, application of speed control, or attention calling given for a predetermined number of times is added as the condition so that the time for the enhanced support mode is prolonged, for example, in a case of a straight road with no obstacles.

Specifically, this is a case, for example, of right or left turn at an intersection or signal stopping for once or more. An example where the attention is called for a predetermined times is a case where attention to a vehicle has been called by three times or more. Further, the time, the distance, the operation number of attention calling times described so far may be combined. For example, in a case where the vehicle runs for one minute or more or 1 Km or longer in the manual driving mode, in which left or right turn at an intersection or signal stopping is not performed once or more, the enhanced support mode is continued until the conditions are satisfied.

Further, the length of the running time in the automatic driving mode may be included in the conditions. As the time in the automatic driving mode is longer, there may be a higher possibility that the driver is in the inattentive state. On the other hand, in a case where the automatic driving mode is terminated just after the starting by some or other reasons, it is considered that the attention or judgement of the driver is scarcely changed from that during the manual driving.

Then, as the running time in the automatic driving mode is longer, the time for the enhanced support mode is made longer after switching to the manual operation mode. As similar setting of conditions, a condition whether the running is started in the manual driving mode or in the automatic driving mode may be added to the condition. In a case where running is started from the automatic driving mode, since driving is started from the state not driven at all by switching to the manual driving, it may possibly take time until the driver is accustomed to driving even if the time for the automatic driving mode is short. Accordingly, in a case where the running is started in the automatic driving mode, the running time in the enhanced support mode is made longer even when the running time in the automatic driving mode is short.

Numerical values shown in the examples of the condition are only the example and such numeral values are not restrictive.

Then, the automatic driving and the driving support processing during the manual driving described so far are to be explained.

Figure 5:
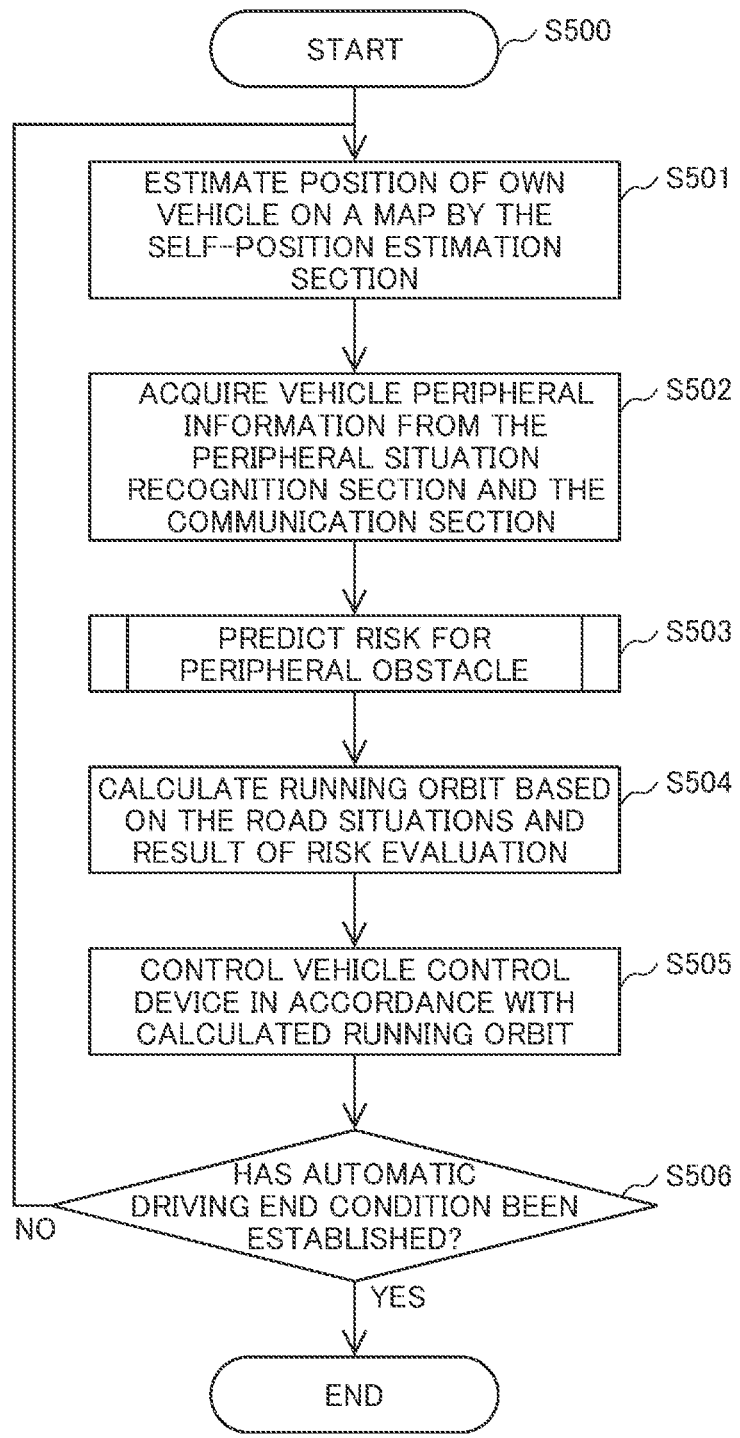
FIG. 5 is a flow chart for the automatic driving processing in an embodiment.

First, the automatic driving processing is to be explained. FIG. 5 illustrates a flow chart of the automatic driving processing performed by the automatic drive control device 100 in this embodiment. The automatic driving mode is a mode of controlling the vehicle without the driver's driving operation by controlling the vehicle control device 001 from the automatic drive control device 100.

In FIG. 5, when the processing is started at S500, the self-location estimation section 106 compares the positioning information acquired by the positioning information receiving section 107 to the map information 108 to determine the location of an own vehicle (S501). In the determination of the location of the own vehicle, an accurate location is estimated by using also the information from a gyro sensor or a direction sensor, and a speed information that can be acquired from the vehicle control device 001.

Next, the peripheral situation recognition section 105 and the communication section 102 collect the information at the periphery of the vehicle (S502). What are acquired by the peripheral situation recognition section 105 are obstacles and the road configurations at the periphery of the vehicle. The peripheral situation recognition section 105 first distinguishes objects and locations thereof based on the information from the camera and the radar connected thereto. Then, it estimates whether the object is stationary or in movement and, in a case of movement, it estimates the direction and the speed of the movement. In the same manner, it recognizes the location of white lines and road ends and absence or presence of gird rails, thereby estimating the load configuration and, at the same time, judges the running location of the own vehicle on the road, or whether the vehicle is out of the lane or not.

On the other hand, the communication section acquires from the road side unit and other vehicles information of an obstacle at a location which cannot be caught by the camera or the laser of the peripheral situation recognition section 105 because of invisible sight. Further, it also acquires information of traffic jam or accident or fallen objects on the road.

Then, the automatic drive control section 101 predicts, based on the information obtained at S502, what is the risk of the obstacle to the own vehicle (S503). The risk shows a possibility of collision with the own vehicle. For example, it is judged that a risk is high for a preceding vehicle at a short inter-vehicle distance or a pedestrian who walks out in the lane. On the other hand, it is judged that a risk is low for a pedestrian during walking in a sidewalk spaced by a guide fence from the lane. Further, even a preceding vehicle or a pedestrian walking on the lane, it is judged that the risk is low if it is spaced from the own vehicle sufficiently. Details for the processing of the risk judgement are to be described later.

Then, the automatic drive control section 101 integrates the information for the situations of obstacles at the periphery of the vehicle and the information on traffic situations and then calculates allowable the running orbit and running speed of the own vehicle (S504). In the calculation of the running orbit, an orbit for running so as not to collide against obstacles is determined with reference to the orbit along the lane and based on the movement prediction for each of the obstacles at the periphery of the vehicle.

Then, finally, the automatic operation control section 101 controls the vehicle control device 001 based on the orbit thereby moving the vehicle (S505). Since the traffic situations keeps fluctuating, the orbit calculated by the automatic drive control section 101 is assumed, for example, as the nearest orbit from the current location to a location about several seconds after and, further, the orbit is optionally amended based on the information acquired by the peripheral situation recognition section 105.

Figure 6:
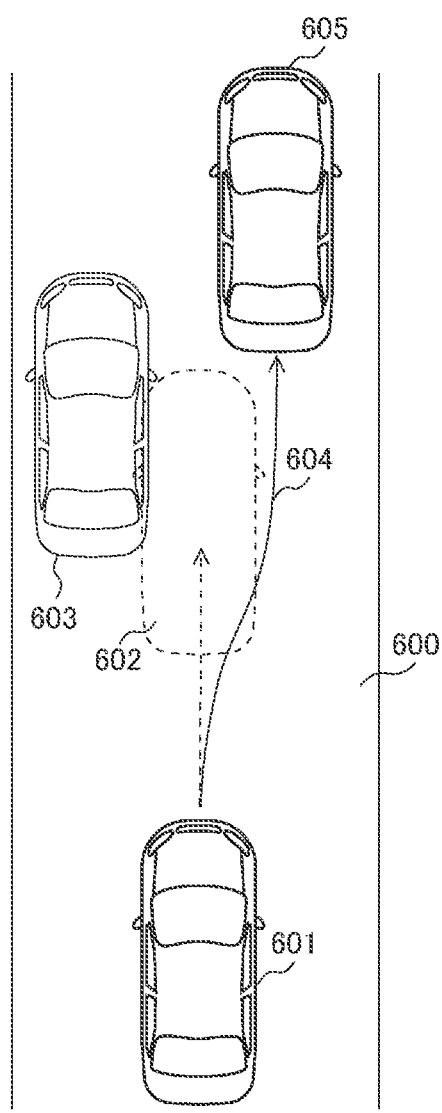
FIG. 6 is a view illustrating an example of a running orbit in the automatic driving mode in an embodiment.

FIG. 6 illustrates an example of a running orbit for avoiding a street-parked vehicle. There are shown a road 600 during running, a present location 601 of an own vehicle, a parking vehicle 603, a future location 602 when the own vehicle runs straight ahead as it is, an avoiding orbit 604, a detailed location 605 of the own vehicle after passing the avoiding orbit. Usually, the automatic drive control device 100 controls the vehicle so as to run at the center of a road.

However, if the street-parked vehicle 603 is present as shown in FIG. 6, and if the own vehicle runs straight ahead as it is to reach a location 602, it is expected to be in contact with the vehicle 603. Then, after recognizing the vehicle 603 at S502, the orbit 604 is calculated at S503 so as not to be in contact with the vehicle 603 and not to deviate from the road 600. Although not illustrated in FIG. 6, the predicted orbits of the own vehicle and the obstacle contain not only the orbit on the map but also the time information expressing the location.

In the automatic driving mode, recognition of the peripheral situations, calculation of the orbit, and control of the vehicle based on the calculated orbit are repeated until the automatic driving termination conditions are established (S506). The automatic driving termination conditions include a case where the vehicle reaches a destination, a case where the automatic driving operation section 103 receives a manual switching instruction, and a case where the automatic driving cannot be continued any more due to the situations on the side of the automatic drive control device 100.

The case where the automatic driving cannot be continued any more includes a case where the automatic drive control device 100 no longer functions sufficiently due to the running circumstances such as lowering of the accuracy of the peripheral situation recognition section 105 due to fogs or the like, a case where the vehicle enters a place where the automatic driving is not possible by the performance of the automatic drive control device 100 such as in a narrow street at a high obstacle density, or a case where the automatic drive control device 100 detects abnormality inside.

In a case where the automatic drive control device 100 does not function sufficiently due to the running circumstances, the peripheral situation recognition section 105 estimates from the information of the sensor connected thereto and transmits to the automatic drive control section 101. As to whether the automatic driving cannot be performed or not in the place by the performance of the automatic drive control device 100, information of such a place is previously acquired from the communication section 102.

Since the operator does not perform driving operation, during the automatic driving mode, attention of the driving is not called as described above. The information notified from the automatic drive control section 101 by way of the information notification section 104 to the driver includes only the running state of the vehicle, the recognition state of peripheral obstacles, etc. Also in the example of avoiding the street-parked vehicle explained with reference to FIG. 6, what is notified from the information notification section 104 is only the running orbit and attention is not called to the parking vehicle 603.

As an exception, in a case where emergency braking or emergency handling is caused for avoiding danger, attention is called to perform such control. With such a configuration, the driver can enjoy a comfortable state during automatic driving mode without paying unnecessary attention to the traffic situations during the automatic driving mode.

Next, the driving support processing during the manual driving is to be described. Also during the manual driving, processing is performed in the same manner as in the automatic driving mode from the recognition of the peripheral situations to the risk prediction of an obstacle. In the manual driving mode, the vehicle control is not preferred and, instead, attention is called to the obstacle which is judged to be at a high risk and, in a case where the risk is high, for example, there is a possibility of collision within two seconds, the driver's operation is supported, for example, by temporal interventional control to the vehicle control device.

Figure 7:
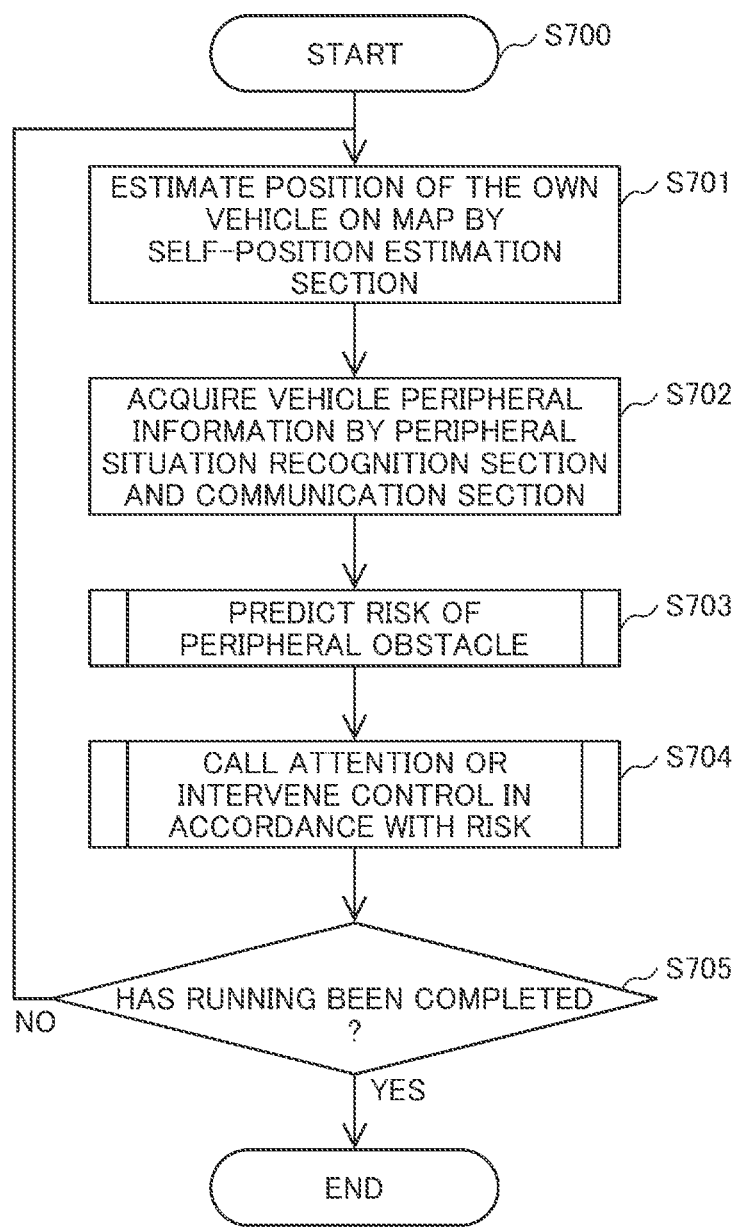
FIG. 7 is a flow chart of driving support processing in the manual driving mode in an embodiment.

FIG. 7 illustrates a flow chart of the driving support processing during the manual driving mode in this embodiment. In FIG. 7, when the processing is started, the self-location estimation section 106 first estimates the location of the own vehicle on the map based on the positioning information acquired by the positioning information receiving section 107 and the map information 108 (S701). Then, the peripheral situation recognition section 105 and the communication section 102 acquire the information at the periphery of the vehicle (S702).

Figure 8:
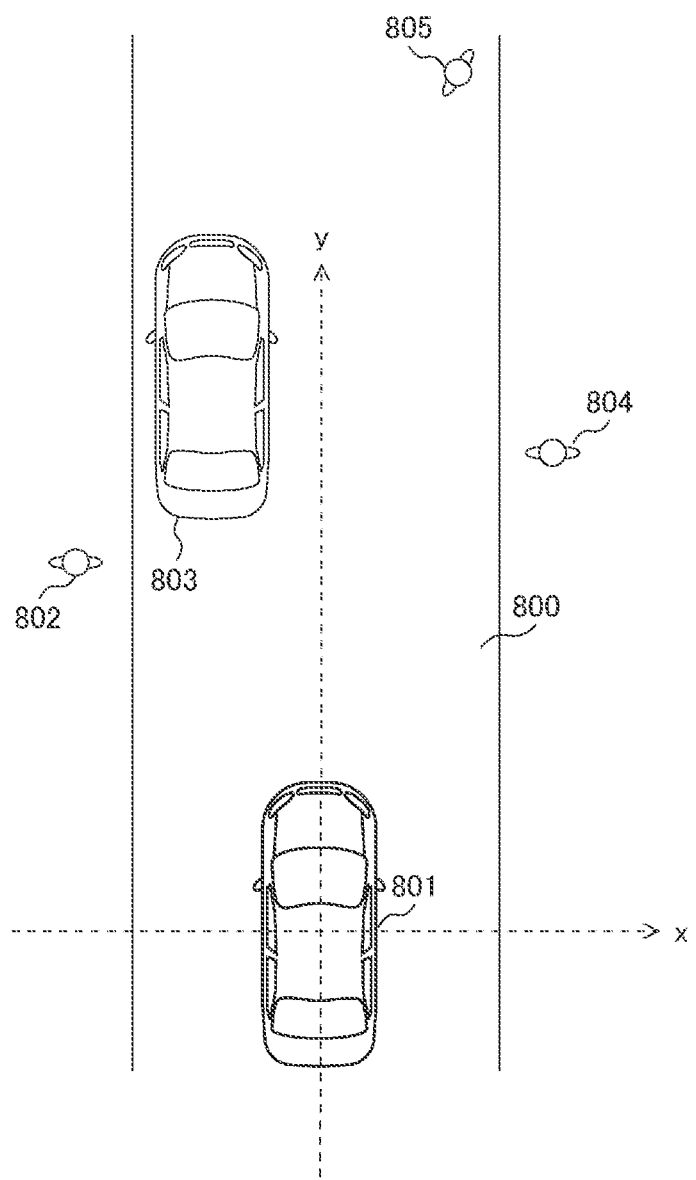
FIG. 8 is a view illustrating an example of an obstacle at the periphery of a vehicle in an embodiment.

FIG. 8 illustrates a drawing showing an example of obstacles and FIG. 9 illustrates an example of a table for the result of obstacle recognition. FIG. 8 shows the presence of a vehicle 803 and pedestrians 802, 804, and 805 at the periphery of an own vehicle 801.

In FIG. 9, the result of obstacle recognition includes ID 901, kind 902, size 903, relative coordinate 904, moving direction 905, and moving speed 906. An ID 901 is an ID allocated inherently to obstacles recognized by the peripheral situation recognition section 105. The kind 902 classifies the obstacles into vehicles, pedestrians, motorbikes, etc. A size 903 is an approximate size of an obstacle and indicates length, width and height when the obstacle is virtually surrounded by a cuboid. The unit is defined by meter.

The relative coordinate 904 is an XY coordinate in a coordinate system having the center of the own vehicle as an original point. The unit is meter. The moving direction 905 shows the moving direction of the obstacle assuming that the advancing direction of the own vehicle in the direction of 12 o'clock. The moving speed 906 is a moving speed of the obstacle. The unit is km/hour.

A vehicle ID1 in FIG. 9 shows a vehicle 803 in FIG. 8. Since this is a parking vehicle, the moving direction 905 has no value and the moving speed is 0. A passenger ID2 shows a passenger 802. A passenger ID3 shows a passenger 804. A passenger ID5 shows a passenger 806. In FIG. 9, other obstacles are assumed to be situated behind the own vehicle 801 and not illustrated in FIG. 8.

Then, in FIG. 7, for the information of obstacles acquired at S702, the extent of the risk is predicted to each of the obstacles (S703). A specific example of the risk judging processing for the obstacles is to be explained.

Figure 11:
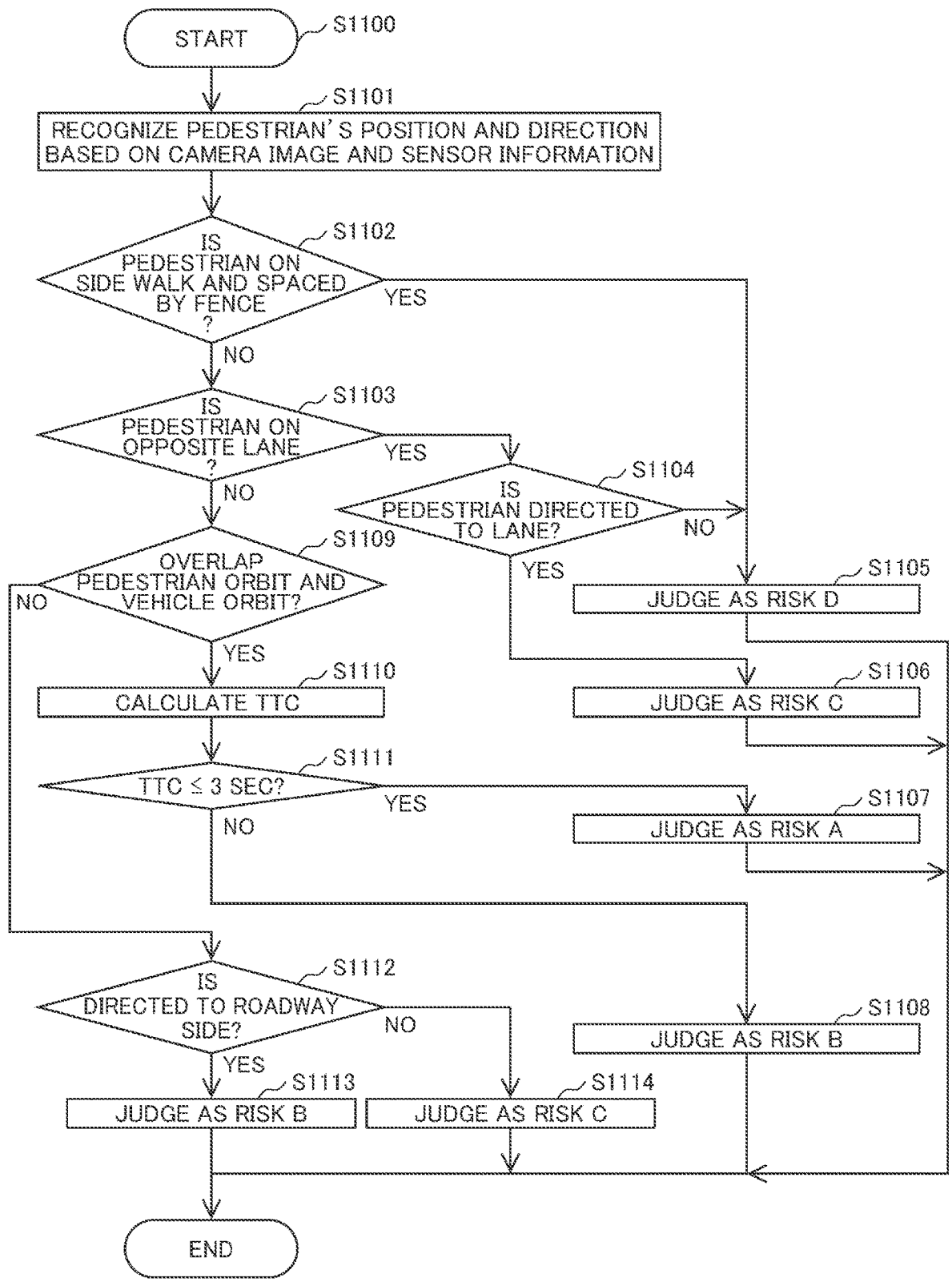
FIG. 11 is a flow chart for explaining pedestrian risk judgement processing in an embodiment.
Figure 12:
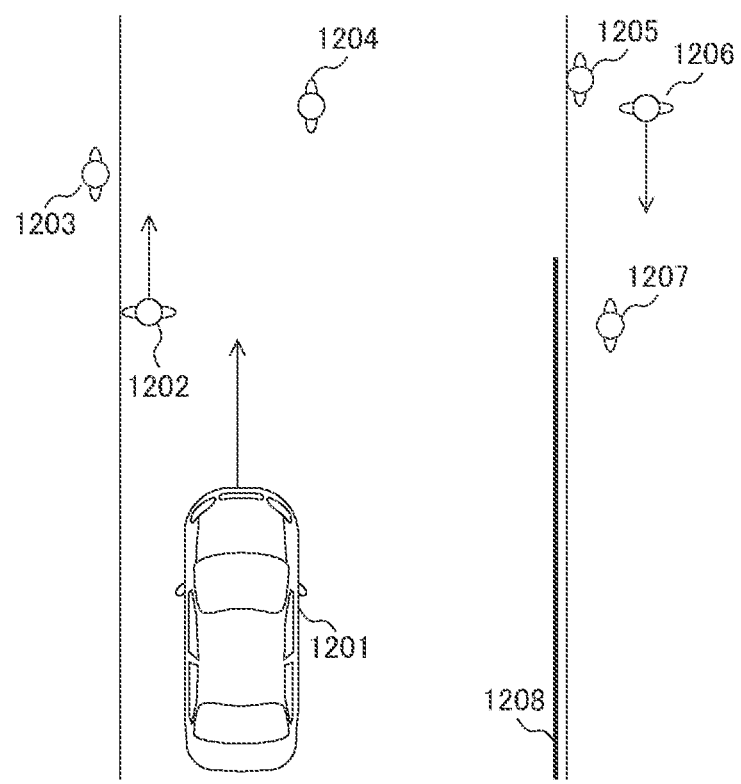
FIG. 12 is a view illustrating an example of an obstacle at the periphery of the vehicle in an embodiment.

FIG. 11 illustrates a flow chart for explaining processing of judging a pedestrian risk and FIG. 12 illustrates examples for the locations of a vehicle and pedestrians. In the processing illustrated in FIG. 11, it is judged, depending on the location and the direction of the pedestrians, what risk they correspond from the risk A at a high risk of collision to a risk D with hardly any possibility of collision. FIG. 12 illustrates an own vehicle 1201 and pedestrians 1202 to 1207. 1208 represents a fence spacing a roadway and a sidewalk.

In FIG. 11, in the pedestrian risk judging processing, the location and the direction of pedestrians are recognized first from camera images and sensor information (S1101). Then, it is checked whether the pedestrian is on the sidewalk or not, and whether or not a protective fence such as a guard rail is provided between the sidewalk and the roadway (S1102). The absence or presence of the fence can be judged based on the camera images and sensor information.

In a case where the fence is provided (S1102: YES), since the possibility that the pedestrian rushed out to the roadway is low, it is judged as risk D (S1105). In FIG. 12, a pedestrian 1207 corresponds to this example. In a case where the fence is not present between the pedestrian and the own vehicle (S1102: YES), it is further classified depending on whether the pedestrian is on the side of the own lane or on the side of the opposite lane (S1103). If the pedestrian is on the opposite lane and not directed to the roadway (S1103: YES) (S1104; NO), it is judged as risk D (S1105). In FIG. 12, 1206 corresponds to this example.

Even if the pedestrian is on the opposite lane, in a case where the pedestrian is directed to the lane (1103: YES, S1104: YES), since the pedestrian may be going to cross the roadway, it is judged somewhat dangerous and defined as risk C (S1106). In FIG. 12, 1205 corresponds to this example. In a case where the pedestrian is on the same lane as that of the own vehicle (S1103: NO), it is judged whether the pedestrian's orbit and the orbit of the own vehicle overlap, that is, whether there is a possibility of collision or not (S1109).

If there is a possibility of collision (S1109: YES) prediction time until collision (TTC: Time to Collision) is calculated (S1110). Then, if TTC≤3 sec (S1111: YES), it is judged as risk A (S1107). In FIG. 12, 1204 corresponds to this example. If TTC is longer (S1111: NO), it is judged as risk B.

In a case where the orbit of the pedestrian and that of the own vehicle do not overlap, it is judged depending on whether the pedestrian is directed to the lane or not in the same manner as in S1104 (S1112). In a case where the pedestrian is directed to the lane, (S1112: YES), since there is a possibility that the pedestrian is going to cross the roadway, it is judged as risk B (S1113). In FIG. 12, 1203 corresponds to this example. In a case where the pedestrian is not directed to the roadway (S1112: NO), it is judged as risk C (S1114). In FIG. 12, S1202 corresponds to this example.

Figure 13:
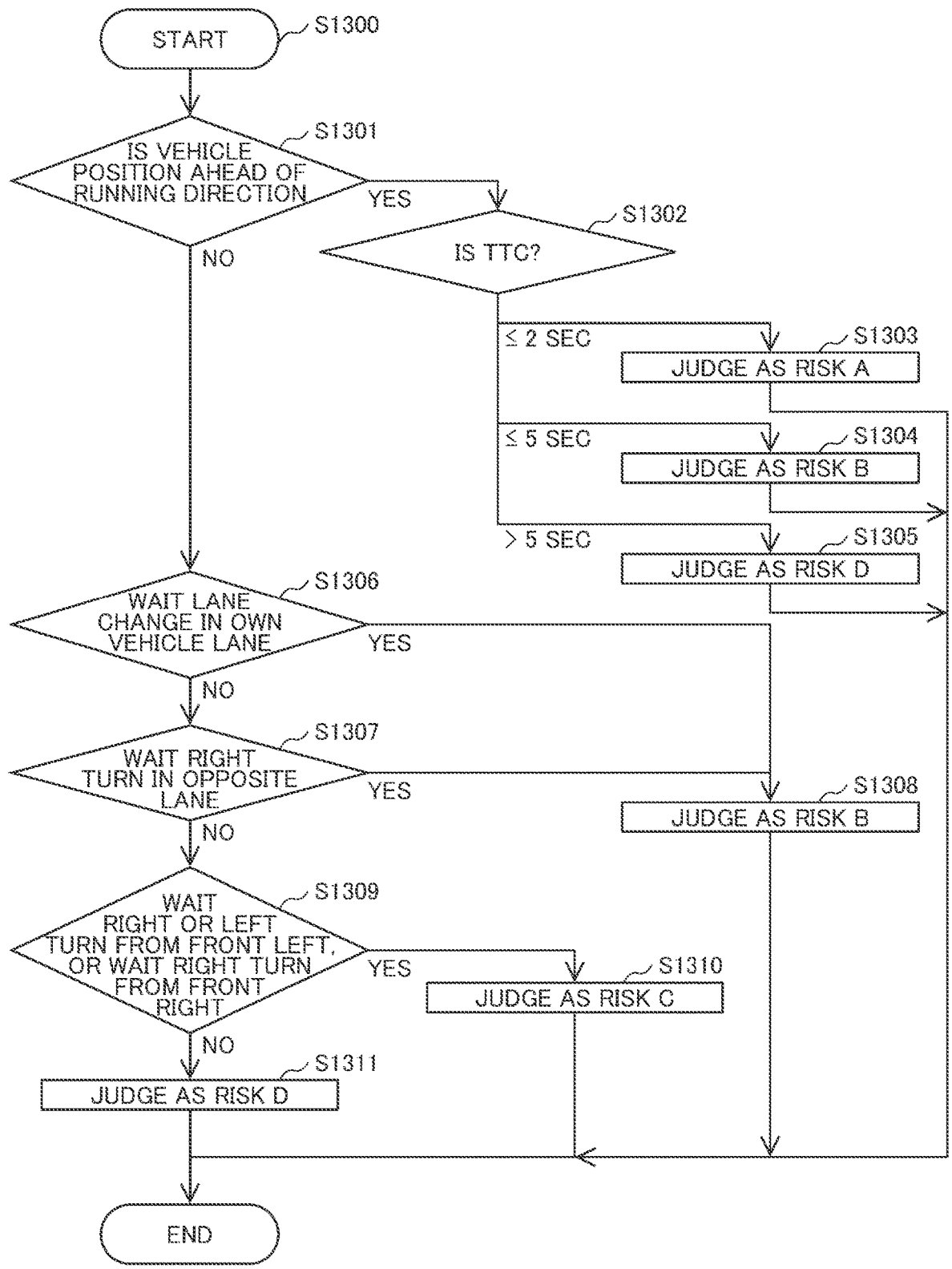
FIG. 13 is a flow chart for explaining vehicle risk judging processing in an embodiment.

The risk is judged also to the vehicle in the same manner as to the pedestrian. FIG. 13 illustrates a flow chart explaining judgement processing of the vehicle risk. In FIG. 13, the processing is first classified depending on whether the vehicle is a vehicle ahead of the running direction or not (S1301). This includes not only a preceding vehicle but also a street-parked vehicle. In the corresponding case, TTC is calculated and a risk level is classified depending on the value (S1302). It is classified as risk A (S1303) in a case of 2 sec or less, as risk B in a case of 2 sec or more and 5 sec or less (S1304) and as risk D in a case of showing longer values (S1305).

If it does not correspond to S1301, this is a vehicle behind the own vehicle, a vehicle on the opposite lane, or a vehicle going out from a parking lot adjacent to the lane. If a vehicle is going to change lanes to the lane of the own vehicle (S1306), it is judged as risk B (S1308). Whether the vehicle is going to change the lanes or not can be judged by recognizing ON-OFF of the vehicle winker by analysis of camera images.

Further, also a vehicle waiting right turn on the opposite lane is judged as risk B (S1307: YES, S1308). For a vehicle going to enter the roadway from a parking lot or the like adjacent to the roadway, it is judged as risk C except for a vehicle going to enter the opposite lane from the right side (on the opposite lane). This is because of a possibility that the vehicle comes front or the forward of the own vehicle. Vehicles corresponding to none of them have low risk and hence are judged as risk D.

With the processing described above, the risk evaluation result in FIG. 10 is derived from the result of obstacle recognition in FIG. 9. In FIG. 10, the risk evaluation result includes ID1001, TTC1 1002, TTC2 1003, risk level 1004, and notice priority 1005. ID1001 is identical with ID901 in FIG. 9. TTC representing the time to collision has two steps of information of TTC1 and TTC2. TTC1 represents the time to collision in a case where the moving speed and the moving direction of the own vehicle and the obstacle are continued as they are. Although the collision possibility of TTC2 is low at the relative distance and speed at present, it represents, for example, time to collision in a case where a stationary object starts moving.

In the examples of FIG. 8 and FIG. 9, since the vehicle 803 as ID1 is at a location where the own vehicle 801 always causes collision if it runs straight, ID1 in FIG. 10 has a value in TTC1. On the other hand, a passenger 805 as ID5 is stationary at the current instance and has a low possibility of collision against the own vehicle 801. However, since there is a possibility of collision when the passenger starts to walk to the side of the roadway, TTC in this case is described to TTC2.

In FIG. 10, the risk level 1004 is a risk level explained in the flow chart illustrated in FIG. 11. The notice priority 1005 is a priority upon calling attention which is determined based on the risk level and the TTC. 1 represents the highest priority and the priority is lowered as the value increases. As the risk level 1004 is higher, the notice priority 1005 goes higher and, at an identical risk level, priority is higher as TTC is shorter. For an obstacle at the risk level D, it is judged that the risk is low and notice is unnecessary and notice priority is not allocated.

The automatic drive control section 101 performs driving support by attention calling or interventional control in accordance with the notice priority determined as described above (FIG. 7, S704).

Figure 14:
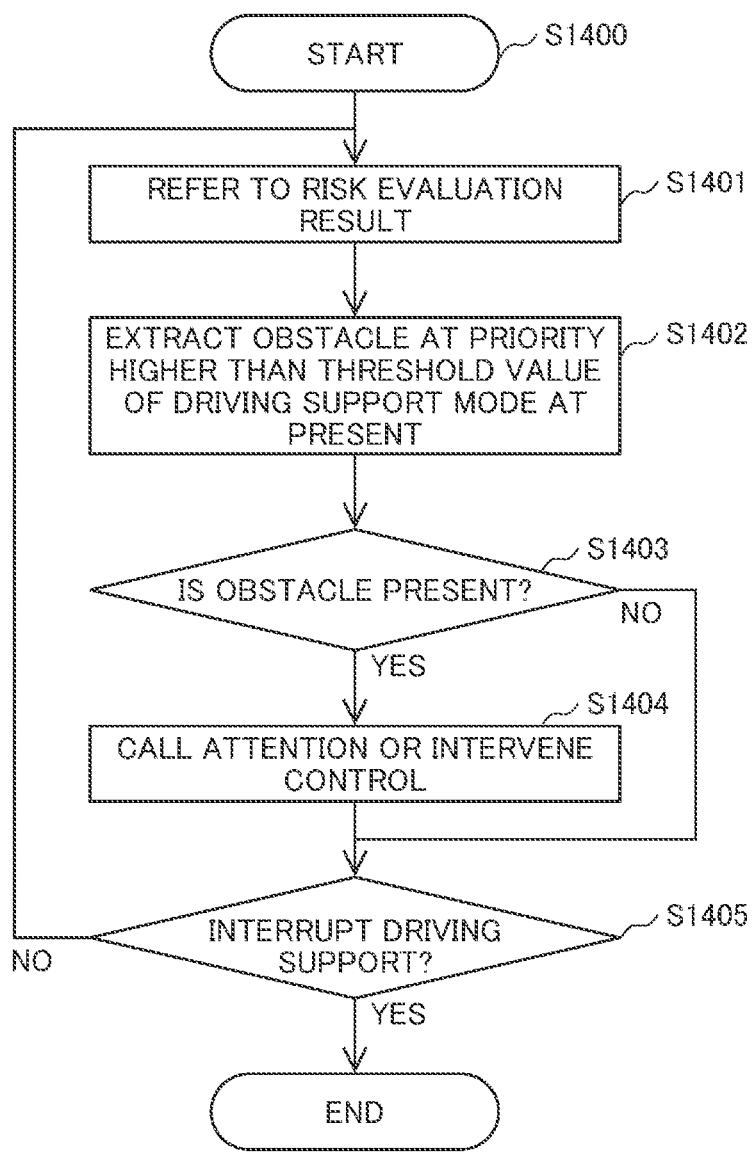
FIG. 14 is a flow chart for explaining call attention processing in an embodiment.

FIG. 14 illustrates a flow chart explaining attention calling processing. In FIG. 14, when the processing is started, the automatic drive control section 101 refers to the result of risk evaluation (S1401). Then, it extracts the information of an obstacle at a higher priority than the threshold value set by the current driving support mode (1402), The driving support mode includes a usual support mode and an enhanced support mode. The threshold value is set lower in the enhanced support mode than that of the usual support mode. For example, the priority is set to 1 or more in the usual support mode and the priority is set to 3 or more in the enhanced support mode. In the result of risk evaluation in FIG. 10, this corresponds only to the vehicle of ID1 with the priority at 1 in the usual support mode and, corresponds also to the pedestrians of ID2, ID3, and ID5 in the enhanced support mode.

As described above, when the obstacle is present (S1403: YES), the automatic driving control section 101 performed attention calling for the obstacle or interventional control (S1404). Then, the driving support is performed by repeating processing until the interruption of the driving support, specifically, until transfer to the automatic driving mode and interruption of the driving support, or termination of the running per se upon reaching the destination (S1405).

Instead of the notice priority 1005 in FIG. 10, the threshold value for the driving support mode may also be judged at the risk level 1004. Further, the driving support mode is not restricted to the two steps but may be further segmented by adding the state of the deriver. Further, the content of the enhanced support may be changed between the override and the manual driving.

Figure 15:
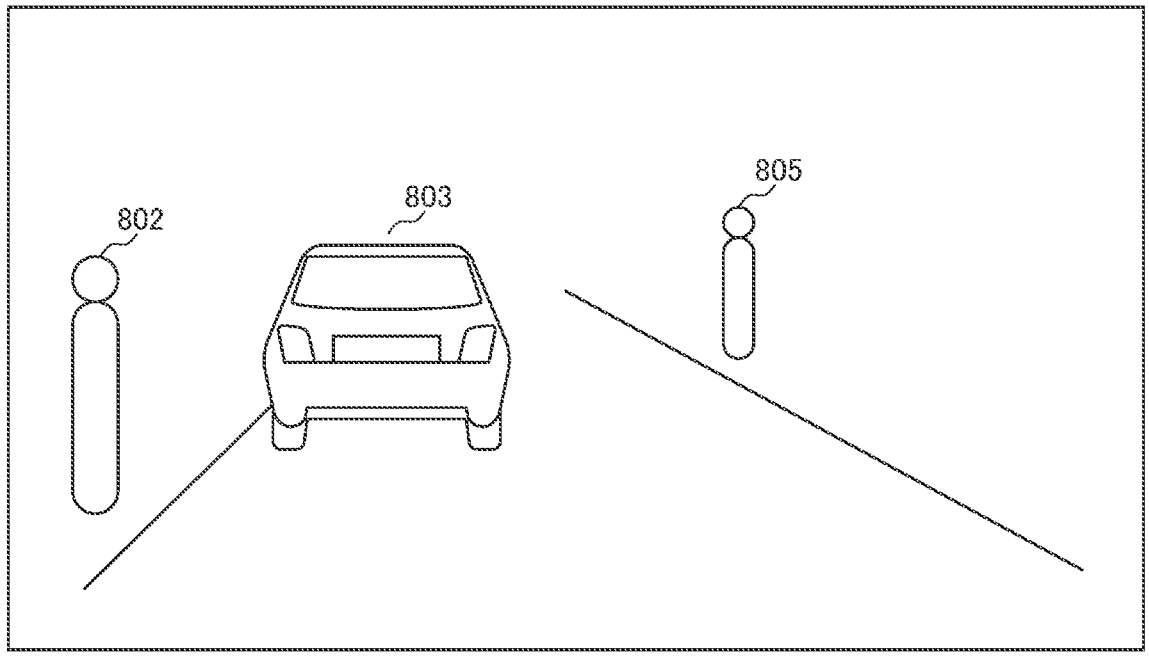
FIG. 15 is a view illustrating an example of a vehicle front view in an embodiment.
Figure 16:
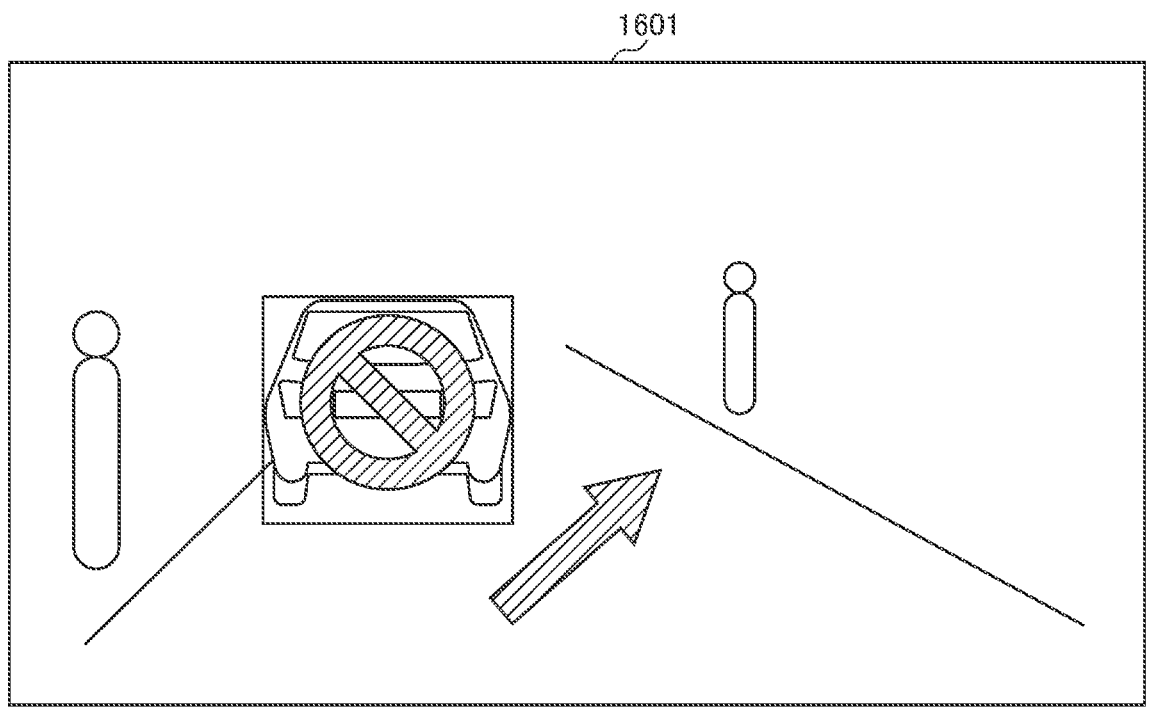
FIG. 16 is a view illustrating an example of the call attention by a head up display in s preferred embodiment.
Figure 16:
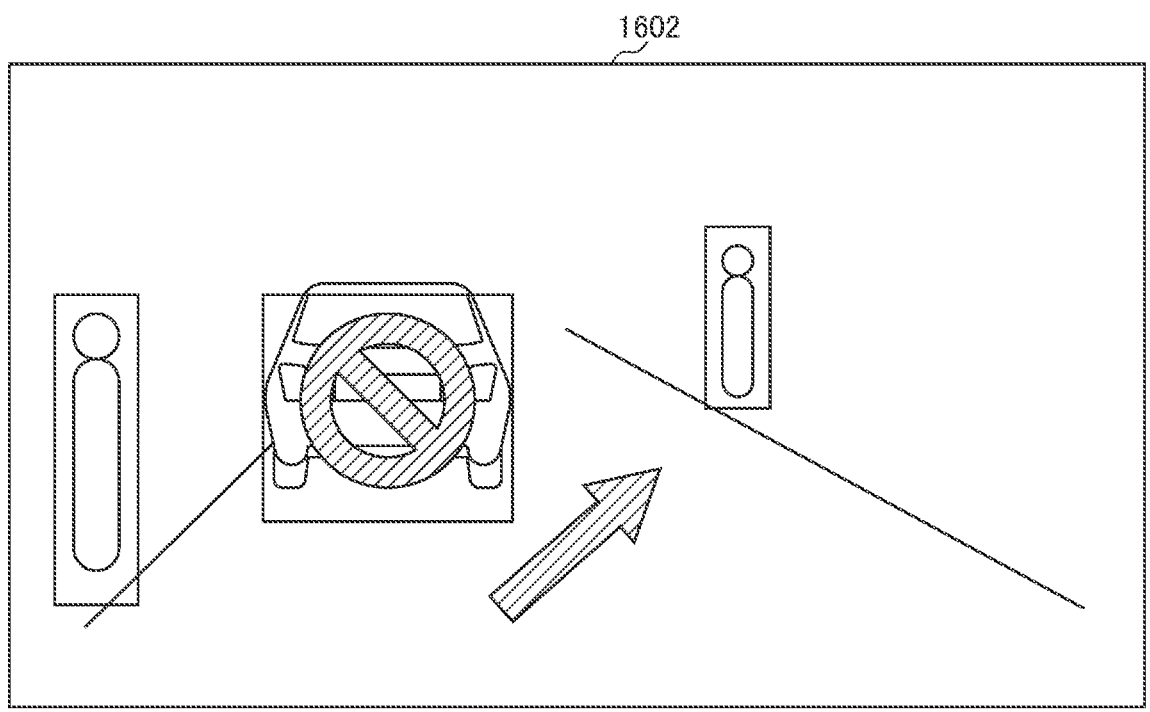
Figure 17:
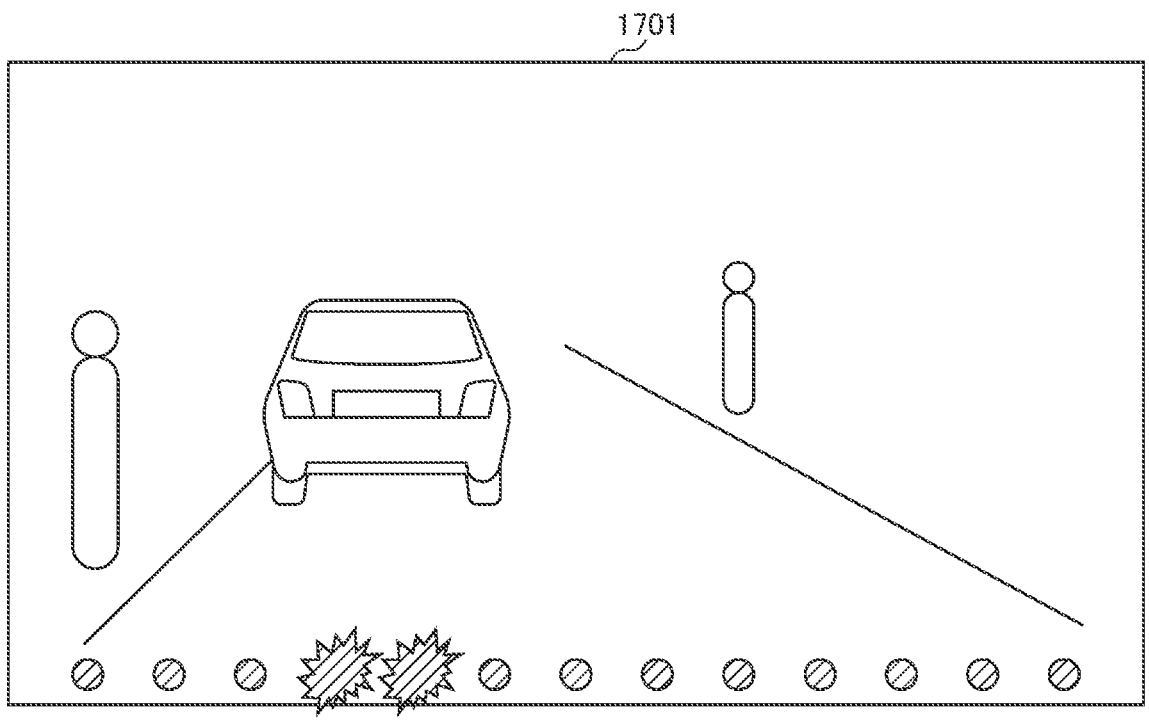
FIG. 17 is a view illustrating an example of the call attention by LED in an embodiment.
Figure 17:
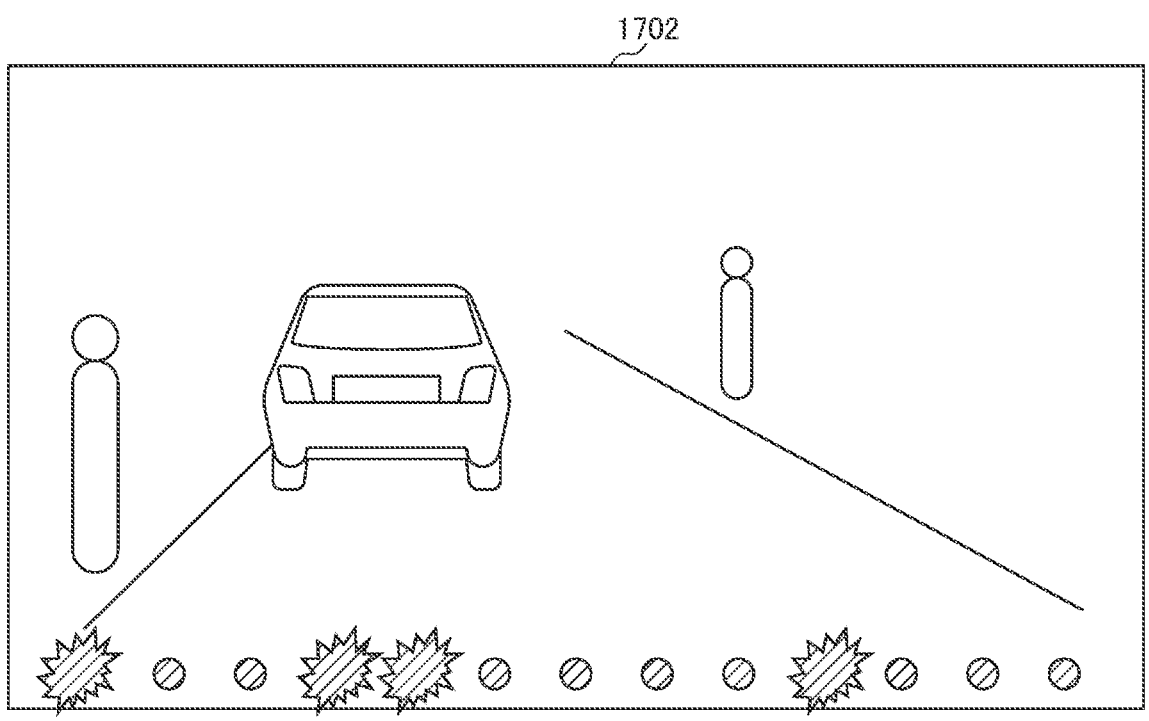

FIG. 15, FIG. 16, and FIG. 17 illustrate examples of attention calling by display. FIG. 15 is a drawing illustrating the forward visual field of the own vehicle in the situation of FIG. 8. 803 represents a front parking vehicle and 802 and 805 represent pedestrians. FIG. 16 illustrates an example of attention calling by a head up display relative to the front visual field in FIG. 15. In FIG. 16, 1601 in the upper drawing shows a usual support mode and 1602 in the lower drawing shows a case of an enhanced support mode. In the visual support mode shown in 1601, only the attention calling and avoiding instruction to the parking vehicle are displayed, whereas, in the enhanced support mode shown in 1602, a marker is displayed also to the pedestrian, thereby drawing the notice.

FIG. 17 is an example of attention calling by lighting up LEDs disposed ahead of the front panel. In FIG. 17, 1701 in the upper drawing shows a case of s usual support mode and 1702 in the lower drawing shows a case of an enriched support mode in the same manner. In the usual support mode shown in 1701, only the LED in the direction of the parking vehicle is lit up. On the other hand, in the enhanced support made shown in 1702, the LEDs in the direction of the pedestrians are also lit up.

As the object for attention calling, only the obstacles having risk of collision with the vehicle, pedestrians, etc. have been referred to. However, overlooking them may lead to accidents. Signals and traffic signs may also be included in the target for attention calling. That is, only the attention is called based on the collision risk in the usual driving mode and, attention is called additionally also to signals and traffic signs in the enhanced support mode.

As specific attention calling to signals and traffic signs, it may be considered to notify of the presence of them by superposition on the scenery in a head up display as shown in FIG. 16, or by way of voice guidance.

Further, in the enhanced support mode, attention calling may be made more conspicuous compared with that in the usual support mode by virtue of display at higher luminance, color of higher brightness, display by higher intermittent flickering, or larger sound volume, or a combination of a plurality of them. An effect of eliminating the inattentive state of a driver earlier can be obtained by conspicuous attention calling.

As described above, this embodiment provides an automatic drive control device capable of switching between a manual driving mode requiring a driving operation by a driver and an automatic driving mode not requiring the driving operation by the driver of the vehicle, including a peripheral situation recognition section for recognizing situations at the periphery of the vehicle, an information notification section for notifying the driver of the vehicle, and an automatic drive control section for controlling the vehicle in the automatic driving mode and controlling the information notification section so as to call attention to the driver of the vehicle based on the peripheral situations recognized by the peripheral situation recognition section, in which the control of the information notification section by the automatic drive control section has first driving support control performed during the manual driving mode and second driving support control performed after switching from the automatic driving mode to the manual driving mode until predetermined conditions are satisfied.

Further, this embodiment provides an automatic drive control method capable of switching between a manual driving mode requiring a driving operation by a driver of a vehicle and an automatic driving mode not requiring the driving operation by the driver of the vehicle, including first driving support control performed during the manual driving mode and second driving support control performed before and after switching from the automatic driving mode to the manual driving mode, in which the second driving support control is adapted to be performed from the manual driving switching guide after switching from the automatic driving mode to the manual driving mode until predetermined conditions are satisfied.

Therefore, according to this embodiment, upon switching from the automatic driving to the manual driving, driving support is performed to the driver in an inattentive state by more intense attention calling to the peripheral obstacles, thereby capable of switching to the manual driving safely. That is, upon switching from the automatic driving to the manual driving, switching from the automatic driving mode to the manual driving mode can be performed safely by supporting recognition, judgement, and operation of the driver upon switching from the automatic driving to the manual driving.

The present invention is not restricted to the embodiments described above but includes various modified embodiments. For example, the embodiments described above are explained specifically for explaining the present invention easy to understand but the present invention is not restricted to those having all of the constitutions described above.

Further, each of the configurations, functions, processing sections, processing steps, etc. described above may be attained by hardware by partially or entirely designing them, for example, with integrated circuits.

Further, control lines and information lines which are considered necessary in view of explanation are shown, but they do not always show all of the control lines and the information lines in view of products. It may be considered that almost all of the configurations are actually connected each other.

REFERENCE SIGNS LIST

001 . . . vehicle control device
002 . . . driving operation device
100 . . . automatic drive control device
101 . . . automatic drive control section
102 . . . communication section
103 . . . automatic drive operation section
104 . . . information notification section
105 . . . peripheral situation recognition section
106 . . . self-location estimation section
107 . . . positioning information receiving section
108 . . . map information
201, 205 . . . manual driving mode
202, 204 . . . automatic driving mode
203 . . . override 209, 214 ... usual support mode
211, 213 ... enhanced support mode
215 ... automatic driving start guide
216 ... manual driving switching guide

The invention claimed is:

1. An automatic drive control device capable of switching between a manual mode requiring a driving operation by a driver of a vehicle and an automatic driving mode not requiring a driving operation by the driver of the vehicle, comprising:
    a peripheral situation recognition section for recognizing peripheral situations of the vehicle;
    an information notification section for notifying the driver of information of the vehicle; and
    an automatic drive control section for controlling the vehicle in the automatic driving mode and controlling the information notification section so as to notify the driver of the information of the vehicle based on the peripheral situations recognized by the peripheral situation recognition section,
    wherein the control of the information notification section by the automatic drive control section includes:
    first driving support control performed during the manual driving mode; and
    second driving support control performed after switching from the automatic driving mode to the manual driving mode until predetermined conditions are satisfied,
    wherein the predetermined conditions include running for a predetermined distance or for a predetermined time after switching to the manual driving mode,
    wherein the automatic drive control section changes a length for the predetermined distance or for the predetermined time in proportion to the time of running in the automatic driving mode, and
    wherein the automatic drive control section sets the length of the predetermined distance or the predetermined time in a case of starting running in the automatic driving mode longer than the length in the case of starting running in the manual driving mode.

2. The automatic drive control device according to claim 1,
    wherein the automatic drive control section judges a risk for the peripheral situations recognized by the peripheral situation recognition section and controls the information notification section so as to call attention in a case where the risk is at or more than a predetermined threshold value, and
    the predetermined threshold value in a case where the second driving support control is performed is lower than the predetermined threshold value in a case where the first driving support control is performed.

3. The automatic drive control device according to claim 1,
    wherein the second driving support control calls attention by one of display at higher luminance, a color of high brightness, display at a faster flickering interval, and a larger sound volume, or a combination of a plurality of them compared with those of the first driving support control.

4. The automatic drive control device according to claim 1,
    wherein the predetermined conditions include performance of attention calling for a predetermined number of times or more after switching to the manual driving mode.

5. The automatic drive control device according to claim 1,
    wherein the predetermined conditions include performance of signal stopping or right or left turn at an intersection a predetermined number of times or more after switching to the manual driving mode.

6. The automatic drive control device according to claim 1,
    wherein the second driving support control is performed from the manual driving switching guide until the predetermined conditions are satisfied.

7. The automatic drive control device according to claim 1,
    wherein the manual driving mode is override, and
    switching from the first driving support control to the second driving support control is made during performance of the driving operation.

8. An automatic drive control method capable of switching between a manual driving mode requiring a driving operation by a driver of a vehicle and an automatic driving mode not requiring the driving operation by the driver of the vehicle, comprising:
    first driving support control performed during the manual driving mode; and
    second driving support control performed after switching from the automatic driving mode to the manual driving mode until predetermined conditions are satisfied,
    wherein the predetermined conditions include running for a predetermined distance or for a predetermined time after switching to the manual driving mode,
    wherein the method further comprises steps of:
    changing a length for the predetermined distance or for the predetermined time in proportion to the time of running in the automatic driving mode, and
    setting the length of the predetermined distance or the predetermined time in a case of starting running in the automatic driving mode longer than the length in the case of starting running in the manual driving mode.

* * * * *